United States Patent [19]

Sakurada et al.

[11] 3,779,881
[45] Dec. 18, 1973

[54] RADIATION GRAFTING OF POLY(ETHYLENE GLYCOL) DIMETHACRYLATE AND OTHER MONOMERS ONTO POLYESTER FIBERS

[75] Inventors: Ichiro Sakurada, Kyoto; Toshio Okada; Yasunao Shimano, both of Osaka, all of Japan

[73] Assignee: Japan Atomic Energy Research Institute, Tokyo, Japan

[22] Filed: Jan. 18, 1972

[21] Appl. No.: 218,815

[30] Foreign Application Priority Data
Jan. 22, 1971  Japan.................................. 46/1571

[52] U.S. Cl............... 204/159.15, 8/115.5, 260/873
[51] Int. Cl............................. B01j 1/10, B01j 1/12
[58] Field of Search.................. 204/159.15, 159.10, 204/159.17

[56] References Cited
UNITED STATES PATENTS

| | | | |
|---|---|---|---|
| 3,670,048 | 6/1972 | Magab et al.................. | 204/159.16 |
| 3,188,165 | 6/1965 | Magab et al.................. | 204/159.15 |
| 3,274,294 | 9/1966 | Stonton et al................. | 204/159.15 |
| 3,652,435 | 3/1972 | Sakuracha et al............. | 204/159.15 |

Primary Examiner—Murray Tillman
Assistant Examiner—Richard B. Turer
Attorney—Richard K. Stevens et al.

[57] ABSTRACT

A mixture of poly (ethylene glycol) dimethacrylate and an alkali metal salt of an ethylenically unsaturated organic acid is polymerized by means of an ionizing radiation on the surface and inside of a polyester fiber material such as poly (ethylene terephthalate) fiber. The treated polyester fiber material is provided with the antistatic and hygroscopic properties as well as durability by washing.

5 Claims, No Drawings

RADIATION GRAFTING OF POLY(ETHYLENE GLYCOL) DIMETHACRYLATE AND OTHER MONOMERS ONTO POLYESTER FIBERS

BACKGROUND OF THE INVENTION

1. Field of the Invention:

This invention is directed to a method of imparting the durable antistatic and hygroscopic properties to a polyester fiber material such as poly (ethylene terephthalate) fiber, and the resulting polyester fiber material.

2. Description of the Prior Art:

Most of synthetic fibers have many excellent chemical and physical properties. Especially, a polyester fiber comprising poly (ethylene terephthalate) possesses many excellent properties for practical uses owing to its heat-set properties. On the other hand, it has the defect of being inferior in the hygroscopic and antistatic properties.

It has been known that the synthetic fibers such as "Nylon" are graft-polymerized with sodium acrylate or sodium styrene-sulfonate by means of an ionizing radiation. But, this method provides the products inferior in hand and feeling of the fiber or fabric.

It has also been known that an aqueous solution of a mixture comprising methylol acrylamide, sodium styrene-sulfonate, acrylic acid and the like is impregnated in the synthetic fibers such as "Nylon" and then the fibers are irradiated with an ionizing radiation. This method is effective in the treatment of "Nylon" fiber or a blended yarn of a polyester fiber and cotton, however, is not so effective in the treatment of a poly (ethylene terephthalate) fiber. Furthermore, the deflect in this method is that the aqueous monomers mixture to be polymerized contains alkaline nitrogen atom; upon washing, the treated fiber is charged to plus since the polymer derived from the monomer component is cationically active, and the dirts which were charged to minus are ready to attach to the fiber.

Also has been known the method of obtaining an antistatic effect in that a methacrylate containing poly (ethylene glycol) group is graft-polymerized on a textile by way of radical reaction mechanism. However, this method is not practicable since the treated fiber is ready to be oily-stained.

SUMMARY OF THE INVENTION

This invention relates to a novel polyester fiber material having the excellent antistatic and hygroscopic properties, and a novel method for imparting the excellent antistatic and hygroscopic properties to a polyester fiber material.

The novel polyester fiber of this invention is prepared by impregnating a mixture of poly (ethylene glycol) dimethacrylate and an alkali metal salt of an ethylenically unsaturated organic acid such as styrene-sulfonic acid, methacrylic acid, acrylic acid and the like in a polyester fiber material, and forming a insoluble polymer on the surface and/or inside of the fiber by means of an ionizing radiation.

The term "polyester fiber" in this invention means (i) a poly (ethylene terephthalate), or a copolymeric polyester fiber comprising ethylene terephthalate and another monomer or monomers such as ethylene diisophthalate; (ii) a polyester blended fiber such as blended yarn fabrics and union fabrics comprising a polyester fiber as defined in the above (i) and other fiber materials such as a cellulose, a wool, a polyamide, a polyacrylonitrile, a polyolefin and the like; and any type of fibers such as filament, tow, yarn, fabric, nonwoven fabric, felt or clothing. Hereinafter, these are referred to as a polyester fiber material.

DESCRIPTION OF THE PREFERRED EMBODIMENTS

In the present invention, is advantageously employed poly (ethylene glycol) dimethacrylate in which molecular weight of poly (ethylene glycol) group being about 300 – 800. The dimethacrylate having poly (ethylene glycol) group of about 400 – 700 in molecular weight is preferably employed, which corresponds to $n =$ about 9 – 16 in the formula of

$$CH_2 = C \cdot CH_3COO - (CH_2CH_2O)_n - OCOC \cdot CH_3 = CH_2.$$

When the above n is outside of about 9 – 16, the antistatic and hygroscopic properties of the treated fabric are rather impaired. When $n$ is smaller, both the feeling and softness of the fabric are rather impaired.

The mixing ratio of poly (ethylene glycol) dimethacrylate with an alkali metal salt of an unsaturated organic acid is 100 parts : 100 parts or less by weight, generally 100 parts : about 1 – 50 parts by weight, and preferably 100 parts : about 5 – 20 parts by weight. It is convenient to employ the above mixture of monomers as an aqueous solution by using a water-soluble alkali salt of the acidic monomer. The concentration of the solution is not especially restricted, but the amount of the resulting polymer onto the fiber can be controlled by using a suitable concentration of the solution. For instance, the amount of impregnant is controlled by immersing a polyester fiber or fabric in an aqueous solution of the monomers and squeezing it with a mangle. Alternatively, a suitable amount of the solution can be sprayed on a polyester fiber or fabric.

The polymerization is generally carried out at room temperature by means of an ionizing radiation. An ionizing radiation typically includes gamma rays, $\beta$ rays, X rays, an electron beam and mixtures thereof. An ultraviolet light from a mercury lamp etc. may also be employed. The dose and dose rate of the ionizing radiation range from just enough to initiate polymerization to just below the amount at which a polyester fiber deteriorates. Generally the dose and dose rate are in the range of about $10^2 – 10^8$ rad and $10^2 – 10^9$ rad/hr. It is preferred to employ an electron beam from an accelerator at a dose rate of about $10^4 – 10^7$ rad/sec.

Thus, copolymerization of poly (ethylene glycol) dimethacrylate and an alkali metal salt of an unsaturated organic acid takes place, and simultaneously cross-linking and graft-polymerization to the polyester fiber take place to provide a water-insoluble polymer. These are considered to enhance the durability of the treated fiber of the present invention.

The present invention is characterized in that a high energy ionizing radiation such as an electron beam can be employed at room temperature in the reaction system. For instance, the reaction can be completed within several seconds with high commercial efficiency by means of an electron beam from an accelerator.

Generally speaking, polymerization velocity of an alkali metal salt of a polymerizable acid is slower than that of the polymerizable acid. Therefore, has been employed a method of polymerizing a polymerizable acid such as acrylic acid and then converting said acid component to a salt in order to enhance the antistatic and hygroscopic property of the fiber. According to the present invention, polymerization can be performed faster and simply by using an alkali metal salt of a polymerizable acid and poly (ethylene glycol) dimethacrylate. Furthermore, there is no fear for corrosion of reactor and the like since no acidic monomer is employed.

A polyester fiber or fabric treated by the present invention does not impair its original feeling and softness and no coloring takes place, even when more than 10 percent by weight of the fiber is polymerized onto the fiber. This is the marked difference from the fiber or fabric on which a hompolymer of a styrene-sulfonate or an acrylate is deposited according to a conventional method. The product of the present invention has the antistatic and hygroscopic properties as well as durability by washing.

The increase in weight (percent of weight increase) after the treatment by the present invention is not especially restricted, but a satisfactory antistatic and hygroscopic properties can be obtained with the increase of about 0.2 – 5 percent by weight of the fiber or fabric to be treated.

Now the invention is illustrated by way of working example. These examples are shown for better understanding of the invention and should not be taken as limiting the scope of the invention. Incidentally, the "static voltage" as shown in the examples is determined by rubbing the sample with cotton fabric, using a rotary static tester, at 22° C and in the atmosphere of 40 percent R.H. The condition of the measurement is 500 grams of load, 700 r.p.m. and rubbing for 1 minute. The "half period" of static voltage indicates the period of time for the static voltage being lowered to 50 percent thereof. The "hygroscopic property" is determined by the following manner. A swatch of the sample is supported horizontally and one drop (0.03 gram) of distilled water is applied to the sample from the height of 1 cm above the sample. The period of time is indicated by "second" for the water applied being completely absorbed and a peculiar reflection light being not observed.

EXAMPLE 1

A swatch 8 cm × 10 cm of poly (ethylene terephthalate) poplin (yarn size No. 50; count, warp 137 and weft 72) was washed with distilled water at 100° C for 2 hours and dried at a reduced pressure. Then, the swatch was immersed in an aqueous solution of 5 percent by weight poly (ethylene glycol) dimethacrylate (hereinafter referred to as PEGMA), the molecular weight (M.W.) of poly (ethylene glycol) group being 316 and PEGMA containing no polymerization inhibitor, and of 0.5 percent by weight sodium styrene-sulfonate at room temperature (25° C) for 1 hour and taken out, and the sample was squeezed between filter paper so that the amount of impregnant was about 35.6 percent by weight of the fabric. The squeezed sample was put in an aluminium foil bag, and the bag was sealed after passing nitrogen for 2 minutes to replace air therein, followed by irradiation with an electron beam from a Van de Graaf accelerator of 1.5 MeV and 50 $\mu$ A using a conveyer. After the irradiation of total dose of 3 Mrad, the sample was taken out of the bag and boiled in 100° C water for 2 hours to remove unreacted monomer and water-soluble polymer. After the treatment, the increase in weight of the fabric was 2.9 percent. The treated fabric was soft, showed a good feeling without coloring, and had the excellent hygroscopic and antistatic properties. As to the hygroscopic property, the treated fabric absorbed water completely in 3.4 seconds, whereas the untreated fabric hardly absorbed water even after 300 seconds. As to the antistatic property, the treated fabric showed a static voltage of 920 volts and the half period thereof of 2.0 seconds, whereas the untreated fabric showed 4,900 volts and more than 1,800 seconds.

For the comparison, Example 1 was repeated except for employing PEGMA without sodium styrene-sulfonate (hereinafter referred to as NaSS), there were obtained the treated fabrics having weight-increase of 1.9 percent and that of 3.8 percent respectively. The control fabrics showed 60.8 seconds and 34.2 seconds respectively for absorbing water. The static voltage of the samples was 1,360 volts and 1,040 volts respectively, and the half period thereof was 2.8 seconds and 3.4 seconds respectively. This control illustrates the excellent effects of the present invention in that the antistatic property and especially the hygroscopic property increase by copolymerizing PEGMA and NaSS, although both antistatic and hygroscopic properties can be improved to some extent by the treatment with PEGMA. Incidentally, no water-insoluble polymer can not be formed on the surface and/or inside of the polyester fiber, when an aqueous solution of NaSS only is employed.

The durability by washing was evaluated in the following manner. 5,000 m$l$ of 0.5 percent aqueous solution of anionic synthetic detergent for textiles ("Hi-top" of Lion Oil and Fat Co., Japan) was employed per 1 gram of the fabric. The treated fabric was washed with the aqueous solution at 60° C for 2.5 hours with stirring. After repeating the washing for 5 times, this corresponding to washing 5 times by means of an ordinary domestic washing machine, the period of time for water-absorption, static voltage and half period thereof were measured to give 2.8 seconds, 980 volts and 3.2 seconds respectively. These data show that hygroscopic and antistatic properties of the treated fabric are not substantially impaired by was of washing.

EXAMPLE 2

Example 1 was repeated except for changing the mixing ratio, concentration of the aqueous solution and dose of irradiation. The results are shown in Table 1. These data clearly show the effect of employing both NaSS and PEGMA.

TABLE 1

| Composition of the treating solution | | Dose of irradiation (Mrad) | Increase in weight (percent) | Static voltage (volt) | Half period thereof (sec.) | Period of time for water-absorption (sec.) |
|---|---|---|---|---|---|---|
| NaSS(%)[a] | PEGMA (%)[a] | | | | | |
| Examples: | | | | | | |
| 2.5 | 5 | 1 | 1.6 | 460 | 1.9 | 9.6 |
| 2.5 | 5 | 3 | 1.9 | 224 | 2.4 | 14.2 |
| 3.0 | 10 | 1 | 3.6 | 940 | 3.2 | 3.4 |
| 1.0 | 10 | 1 | 3.9 | 84 | 1.8 | 8.5 |
| 1.0 | 10 | 3 | 4.9 | 36 | 1.7 | 8.2 |
| 0.5 | 10 | 3 | 3.9 | 128 | 1.8 | 8.0 |
| Controls: | | | | | | |
| 0 | 5 | 3 | 1.9 | 1360 | 2.8 | 60.8 |
| 0 | 7 | 3 | 2.8 | 1040 | 3.4 | 34.2 |
| 0 | 10 | 3 | 7.0 | 580 | 1.9 | 45.0 |
| 10 | 0 | 3 | 0 | 3200 | >1800 | >300 |
| Untreated fabric | | — | 0 | 4900 | >1800 | >300 |

[a] Percent by weight of the aqueous solution.

It is noted that both the antistatic and hygroscopic properties increase in the presence of even a small amount of NaSS in addition to PEGMA. According to the washing test as shown in Example 1, both the antistatic property and period of time for water-absorption did not change substantially.

EXAMPLE 3

Example 1 was repeated except for employing sodium acrylate (hereinafter referred to as NaAA) as an alkali metal salt of an acidic monomer, instead of NaSS. The results exhibited the excellent hygroscopic and antistatic properties as well as durability by washing without changing feeling and color of the fabric, as shown in Table 2.

EXAMPLE 4

Example 1 was repeated except for employing potassium acrylate (hereinafter referred to as KAA) as an alkali metal salt of an acidic monomer, instead of NaSS. The results exhibited the excellent hygroscopic and antistatic properties as well as durability by washing without changing feeling and color of the fabric, as shown in Table 3.

EXAMPLE 5

Example 1 was repeated except for employing sodium methacrylate (hereinafter referred to as NaMAA) as an alkali metal salt of an acidic monomer, instead of NaSS. The results exhibited the excellent hygroscopic and antistatic properties as well as durability by washing without changing feeling and color of the fabric, as shown in Table 4.

TABLE 2

| Composition of the treating solution | | Dose of irradiation (Mrad) | Increase in weight (percent) | Static voltage (volt) | | Half period thereof (sec.) | | Period of time for water-absorption (sec.) | |
|---|---|---|---|---|---|---|---|---|---|
| NaAA (%) | PEGMA (%) | | | Before washing | After washing | Before washing | After washing | Before washing | After washing |
| Examples | | | | | | | | | |
| 5 | 15 | 1 | 5.5 | 380 | 520 | 1.5 | 2.0 | 3.4 | 3.5 |
| 2.5 | 0 | 1 | 7.9 | 180 | 250 | 2.3 | 1.8 | 4.2 | 3.5 |
| Controls | | | | | | | | | |
| 5 | 15 | 1 | 0 | 3600 | | >1800 | | >300 | |
| 5 | 0 | 3 | 0 | 3900 | | >1800 | | >300 | |

TABLE 3

| Composition of the treating solution | | Dose of irradiation (Mrad) | Increase in weight (percent) | Static voltage (volt) | | Half period thereof (sec.) | | Period of time for water-absorption (sec.) | |
|---|---|---|---|---|---|---|---|---|---|
| KAA (%) | PEGMA (%) | | | Before washing | After washing | Before washing | After washing | Before washing | After washing |
| Examples | | | | | | | | | |
| 5 | 15 | 1 | 5.8 | 420 | 630 | 2.4 | 3.0 | 14.8 | 10.5 |
| 2.5 | 10 | 1 | 4.9 | 248 | 350 | 1.9 | 2.5 | 40.0 | 21.3 |
| Controls | | | | | | | | | |
| 0 | 0 | 1 | 0 | 3900 | | >1800 | | >300 | |
| 0 | 0 | 8 | 0 | 2600 | | >1800 | | >300 | |

TABLE 4

| Composition of the treating solution | | Dose of irradiation (Mrad) | Increase in weight (percent) | Static voltage (volt) | | Half period thereof (sec.) | | Period of time for water-absorption (sec.) | |
|---|---|---|---|---|---|---|---|---|---|
| NaMAA (%) | PEGMA (%) | | | Before washing | After washing | Before washing | After washing | Before washing | After washing |
| Examples | | | | | | | | | |
| 5 | 15 | 1 | 4.2 | 520 | 680 | 2.5 | 3.0 | 15.9 | 12.3 |
| 2.5 | 15 | 1 | 6.1 | 380 | 450 | 2.1 | 2.9 | 24.6 | 19.5 |
| Controls | | | | | | | | | |
| 5 | 0 | 1 | 0 | 2900 | | >1800 | | >300 | |
| 5 | 0 | 3 | 0 | 2900 | | >1800 | | >300 | |

What we claim is:

1. A method for imparting durable antistatic and hygroscopic properties to a polyester fiber material having an ethylene terephthalate component comprising treating said fiber material containing as a major component a polymer selected from the group consisting of
   i a poly(ethylene terephthalate) fiber,
   ii a copolymeric polyester fiber of ethylene terephthalate and ethylene diisophthalate,
with an aqueous mixture of poly(ethylene glycol) dimethacrylate and an alkali metal salt of an ethylenically unsaturated organic acid selected from the group consisting of styrene-sulfonic acid, methacrylic acid and acrylic acid wherein said salt is present in an amount of about 1–50 parts by weight per 100 parts of poly(ethylene glycol) dimethacrylate and then
   forming a water-insoluble polymer on the surface and inside of the fiber material by means of ionizing radiation selected from the group consisting of gamma rays, beta rays, X-rays, electron beam in a dosage of about $10^2 - 10^8$ rad. at a dose rate of $10^2 - 10^9$ rad./hr. and ultraviolet light.

2. The method of claim 1, in which is employed poly(ethylene glycol) dimethacrylate in which the molecular weight of its ethylene glycol group is about 300 – 800.

3. The method of claim 1, in which polymerization is carried out so that percent of weight increase is about 0.2 – 10 percent by weight of the polyester fiber material to be treated.

4. A durable antistatic and hygroscopic polyester fiber material having an ethylene terephthalate component, said polyester fiber material being selected from the group consisting of
   i a poly(ethylene terephthalate)fiber,
   ii a copolymeric polyester fiber of ethylene terephthalate and ethylenediisophthalate,
characterized in that an aqueous mixture of poly(ethylene glycol) dimethacrylate with a molecular weight of 300 – 800 for the poly(ethylene glycol) group and an alkali metal salt of an ethylenically unsaturated organic acid selected from the group consisting of styrene-sulfonic acid, methacrylic acid and acrylic acid wherein said salt is present in an amount of about 1–50 parts by weight per 100 parts of poly(ethylene glycol) dimethacrylate is polymerized to form a water-insoluble polymer on the surface and inside of said fiber material by means of an ionizing radiation selected from the group consisting of gamma rays, beta rays, X-rays, electron beam in a dosage of about $10^2 - 10^8$ rad. at a dose rate of $10^2 - 10^9$ rad./hr. and ultraviolet light.

5. The durable antistatic and hygroscopic polyester fiber material of claim 4, in which percent of weight increase after the polymerization is about 0.2 – 10 percent by weight of the polyester fiber material to be treated.

* * * * *